(12) United States Patent
Mauch

(10) Patent No.: US 6,170,949 B1
(45) Date of Patent: Jan. 9, 2001

(54) SPECTACLE FRAMES

(75) Inventor: Frank R. Mauch, Bilgola Plateau (AU)

(73) Assignee: Domani Eyewear Pty Ltd., Mona Vale (AU)

( * ) Notice: Under 35 U.S.C. 154(b), the term of this patent shall be extended for 0 days.

(21) Appl. No.: 09/512,003

(22) Filed: Feb. 24, 2000

Related U.S. Application Data

(63) Continuation of application No. PCT/AU99/00339, filed on May 7, 1999.

(51) Int. Cl.[7] ............................................. G02C 9/00

(52) U.S. Cl. ................................. 351/47; 351/57

(58) Field of Search ..................... 381/47, 57, 48, 381/58

(56) References Cited

U.S. PATENT DOCUMENTS

| | | | |
|---|---|---|---|
| 5,568,207 | * 10/1996 | Chas | 351/47 |
| 5,696,571 | * 12/1997 | Spencer et al. | 351/47 |
| 5,786,880 | 7/1998 | Chao | 351/47 |
| 5,882,101 | 3/1999 | Chao | 351/47 |
| 5,940,162 | 8/1999 | Wong | 351/47 |

OTHER PUBLICATIONS

Derwent abstract accession No. 98–560068/48, class P81, FR 2762406 A (Ira Lerner Inc) Oct. 23, 1998.
Patent Abstract of Japan, JP, 10–288759 A (Asahi Optical Co Ltd) Oct. 27, 1998.

* cited by examiner

*Primary Examiner*—Hung Xuan Dang
(74) *Attorney, Agent, or Firm*—Townsend and Townsend and Crew LLP

(57) ABSTRACT

A spectacle frame assembly comprises a primary spectacle frame (100) and an auxiliary spectacle frame (200). The primary and secondary spectacle frames (100, 200) each have a pair of rims (113, 213) for receiving a pair of lenses, a bridge (114, 214) separating the rims (113, 213) and arms (112, 212) secured to laterally outer portions of each of the rims (113, 213). A primary frame lug (130) is secured to each of the primary frame arms (120) and an auxiliary frame lug (230) is secured to each of the auxiliary frame arms (212). The auxiliary frame lugs (230) are each engageable with a corresponding primary frame lug (130) with the auxiliary frame lug (230) disposed on top of the primary frame lug (130) so as to secure the auxiliary spectacle frame (200) to the primary spectacle frame (100). The primary frame lugs (230) are each provided with a magnetic member (131) receivable in an open cavity (231) provided in the respective auxiliary frame lug (230). An alternate assembly utilises rimless primary and auxiliary spectacle frames (300, 400).

19 Claims, 6 Drawing Sheets

SPECTACLE FRAMES

This is a continuation application of International Application PCT/AU99/00339, with an international filing date of May 7, 1999.

TECHNICAL FIELD

The present invention relates to spectacle frames, and in particular relates to spectacle frame assemblies having a primary spectacle frame and a detachable auxiliary spectacle frame.

BACKGROUND OF THE INVENTION

To enable the use of sunglass lenses with spectacles having prescription lenses, various forms of "clip-on" detachable auxiliary spectacle frames have been proposed which allow the auxiliary frame housing sunglass lenses to be clipped onto the frame front of the primary spectacle frame housing the prescription lenses via various forms of clips. The success of the various forms of clips varies in terms of security of attachment, non-intrusive appearance and ease of attachment/detachment.

Replacement of the clip type attachment means with cooperating magnetic attachments on both the primary and auxiliary spectacle frames has also been proposed. The security of attachment of currently available spectacle frame assemblies of this type is quite poor, however, with the auxiliary spectacle frame typically being free to rattle, vibrate or flicker and possibly disengage with any jarring movements of the wearer, such as during various forms of exercise. Rattling, vibrating or flickering of the auxiliary spectacle frame can be uncomfortable and possibly harmful to the human eye by causing optical distortion as well as rapid variations in light levels if light is able to pass around the tinted lenses of the auxiliary spectacle frames when displaced.

OBJECT OF THE INVENTION

It is the object of the present invention to overcome or substantially ameliorate at least some of the above disadvantages.

SUMMARY OF THE INVENTION

There is disclosed herein a spectacle frame assembly comprising:

a primary spectacle frame having a primary frame front, a pair of temples pivotally coupled to respective laterally outer ends of said primary frame front and a pair of primary frame lugs secured to said primary frame front adjacent respective said primary frame front laterally outer ends, and an auxiliary spectacle frame having a pair of auxiliary frame lugs disposed at respective laterally outer ends thereof, each said auxiliary frame lug being engageable with a corresponding said primary frame lug with said auxiliary frame lug disposed on top of said corresponding primary frame lug for securing said auxiliary spectacle frame to said primary spectacle frame, wherein, for each pair of corresponding primary and auxiliary frame lugs, one of said primary and auxiliary frame lugs is provided with a magnetic member receivable in an open cavity provided in the other one of said primary and auxiliary frame lugs, said open cavity having a peripheral wall for engaging a peripheral wall of said magnetic member, said other one of said primary and auxiliary frame lugs being formed at least partially of a ferrous material.

Typically said primary spectacle frame front is provided with a pair of primary frame arms toward respective said laterally outer ends thereof, said temples being pivotally coupled to respective said primary frame arms and said primary frame lugs being secured to respective said primary frame arms.

Typically, said auxiliary spectacle frame is provided with a pair of auxiliary frame arms toward respective said opposing laterally outer ends thereof, said auxiliary frame lugs being secured to respective said auxiliary frame arms.

Typically said primary frame lugs are disposed rearwardly of said primary frame arms, said auxiliary frame arms being adapted to extend over said primary frame arms to enable engagement of said primary and auxiliary frame lugs.

Typically, each of said primary frame lugs is provided with a said magnetic member and each of said auxiliary frame lugs is provided with a said open cavity.

Typically each said primary frame lug comprises a ring secured to the respective said primary frame arm and a said magnetic member secured in said ring such that said magnetic member peripheral wall protrudes above said ring.

Typically each of said auxiliary frame lugs comprises a hollow cylinder secured to the respective said auxiliary frame arm, said open cavity being defined by the hollow of said hollow cylinder.

Preferably said open cavity of each said auxiliary frame lug is open at a lower end only for receiving said magnetic member, an upper end of said cavity being closed by a wall of ferrous material for engaging an upper surface of said magnetic member.

Alternatively said open cavity of each said auxiliary frame lug is open at both upper and lower ends thereof.

Preferably each said auxiliary frame lug is made substantially entirely of ferrous material.

Preferably a lower surface of each said primary frame lug is substantially flush with a lower surface of the respective said primary frame arm. It is also preferred that an upper surface of each said primary frame lug is substantially flush with an upper surface of the respective said primary frame arm.

Alternatively, each of said auxiliary frame lugs is provided with a said magnetic member and each of said primary frame lugs is provided with a said open cavity.

Typically said primary frame front includes a pair of primary frame rims for receiving a pair of primary lenses and a primary frame bridge secured to and separating said primary frame rims, said primary frame arms being secured to laterally outer portions of each of said primary frame rims.

Alternatively said primary frame front includes a pair of primary lenses and an auxiliary frame bridge secured to and separating said primary lenses, said primary frame arms being secured to laterally outer portions of each of said primary lenses.

Typically said auxiliary spectacle frame includes a pair of auxiliary frame rims for receiving a pair of auxiliary lenses and an auxiliary frame bridge secured to and separating said auxiliary frame rims, said auxiliary frame arms being secured to laterally outer portions of each of said auxiliary frame rims.

Alternatively said auxiliary spectacle frame includes a pair of auxiliary lenses and an auxiliary frame bridge secured to and separating said auxiliary lenses, said auxiliary frame arms being secured to laterally outer portions of each of said auxiliary lenses.

Preferably said auxiliary frame bridge extends over and engages said primary frame bridge.

There is further disclosed herein a spectacle frame assembly comprising:

a primary spectacle frame having a pair of primary frame rims for receiving a pair of primary lenses, a primary frame bridge separating said primary frame rims, a primary frame arm secured to laterally outer portions of each of said primary frame rims, a temple pivotally coupled to each said primary frame arm and a primary frame lug secured to each of said primary frame arms, and an auxiliary spectacle frame having a pair of auxiliary frame rims for receiving a pair of auxiliary lenses, an auxiliary frame bridge separating said auxiliary frame rims, an auxiliary frame arm secured to laterally outer portions of each of said auxiliary frame rims and an auxiliary frame lug secured to each of said auxiliary frame arms, said auxiliary frame lugs each being engageable with a corresponding said primary frame lug with said auxiliary frame lug disposed on top of said primary frame lug so as to secure said auxiliary spectacle frame to said primary spectacle frame, wherein, for each pair of corresponding primary and auxiliary frame lugs, one of said primary and auxiliary frame lugs is provided with a magnetic member receivable in an open cavity provided in the other one of said primary and auxiliary frame lugs, said open cavity having a peripheral wall for engaging a peripheral wall of said magnetic member, said other one of said primary and auxiliary frame lugs being formed at least partially of a ferrous material.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENTS

Figure 1:
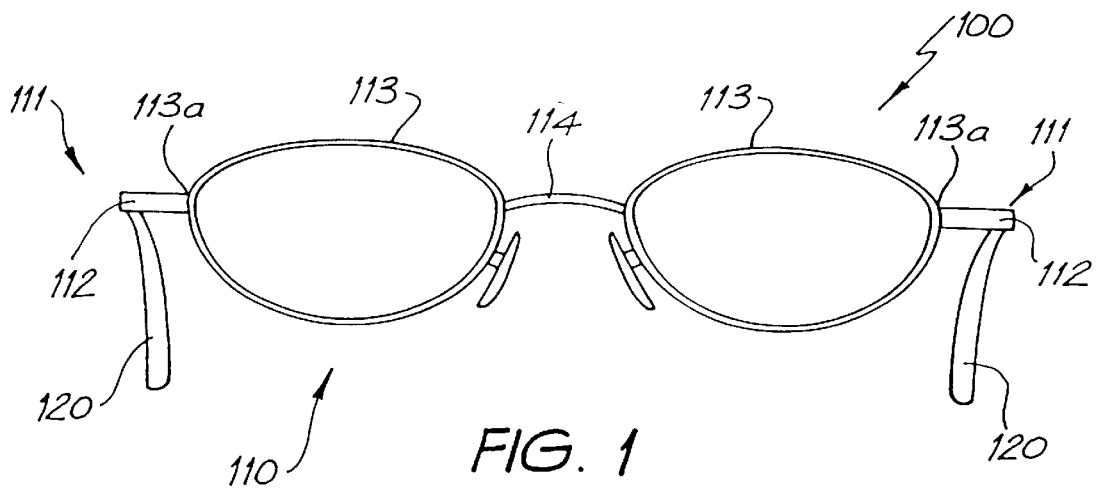
FIG. 1 is a front elevation view of a primary spectacle frame.
Figure 2:
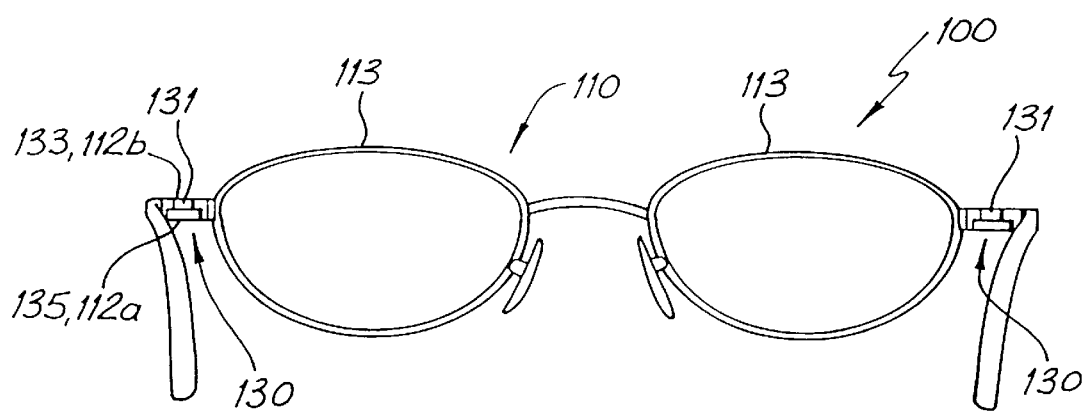
FIG. 2 is a rear elevation view of the primary spectacle frame of FIG. 1.
Figure 3:
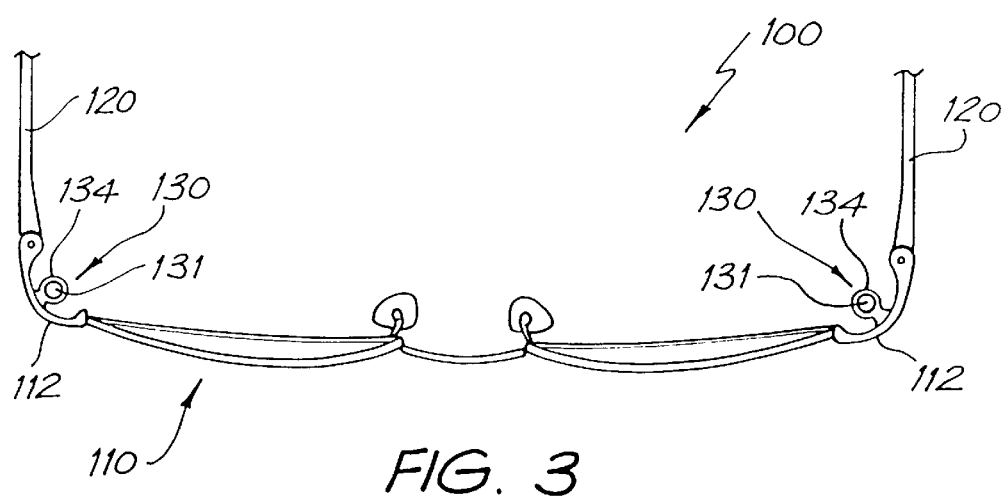
FIG. 3 is a plan view of the primary spectacle frame of FIG. 1.

With reference to FIGS. 1 through 9, a first embodiment of the current invention provides a spectacle frame assembly comprising a primary spectacle frame 100 and an auxiliary spectacle frame 200 which can be secured to the primary spectacle frame 100. The primary spectacle frame 100 will typically house prescription lenses, with the auxiliary spectacle frame 200 housing tinted sunglass lenses as per common "clip on" assemblies.

The primary spectacle frame 100 has a primary frame front 110, a pair of temples 120 for engaging the ears and the sides of the wearer's head pivotally coupled to laterally outer ends 111 of the primary frame front 110 and a pair of primary frame lugs 130 which are secured to the primary frame front 110 adjacent the laterally outer ends 111 of the primary frame front 110. For a conventional primary spectacle frame 100, the primary frame front 110 will typically be provided with a primary frame arm 112 toward each lateral end 111 with the temples 120 being pivotally coupled to the primary frame arms 112 and the primary frame lugs 130 secured to the primary frame arms 112. For spectacle frame designs without distinct arms 112, however, the primary frame lugs 130 can still be suitably secured to the frame adjacent the primary frame front lateral ends.

Figure 6:
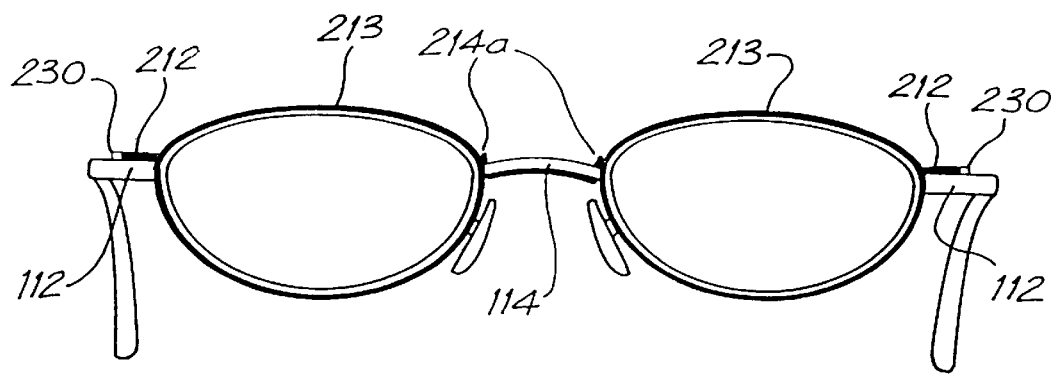
FIG. 6 is a front elevation view of a spectacle frame assembly of the primary spectacle frame of FIG. 1 and the auxiliary spectacle frame of FIG. 4.
Figure 7:
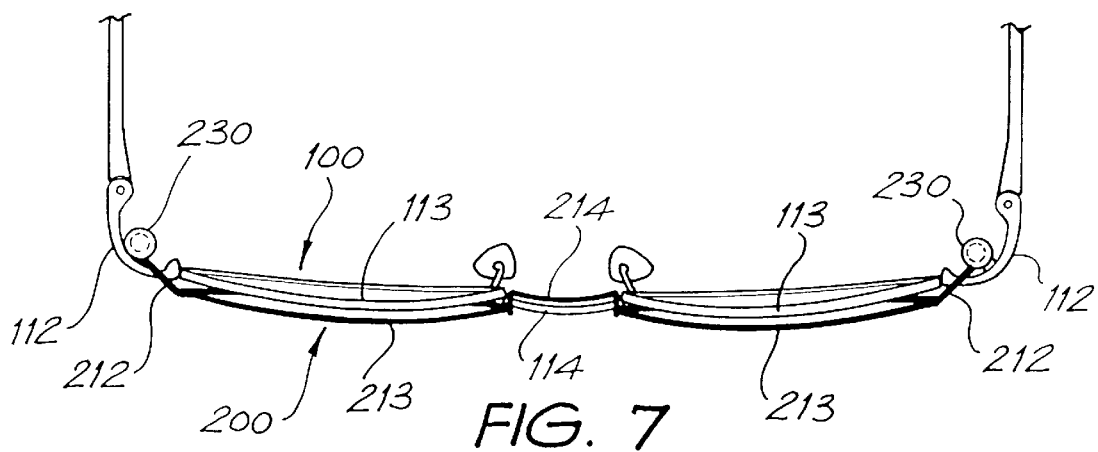
FIG. 7 is a plan view of the spectacle frame assembly of FIG. 6.

The auxiliary spectacle frame 200 has a pair of auxiliary frame lugs 230 disposed at laterally outer ends 211 thereof. The auxiliary frame lugs 230 are typically secured to auxiliary frame arms 212 provided toward each laterally outer end of the auxiliary frame 200. The auxiliary frame lugs 230 are each engageable with the corresponding primary frame lug 130 with the auxiliary frame lug 230 disposed on top of the corresponding primary frame lug 130, as depicted in FIGS. 6 and 7 to secure the auxiliary spectacle frame 200 to the primary spectacle frame 100.

Figure 8:
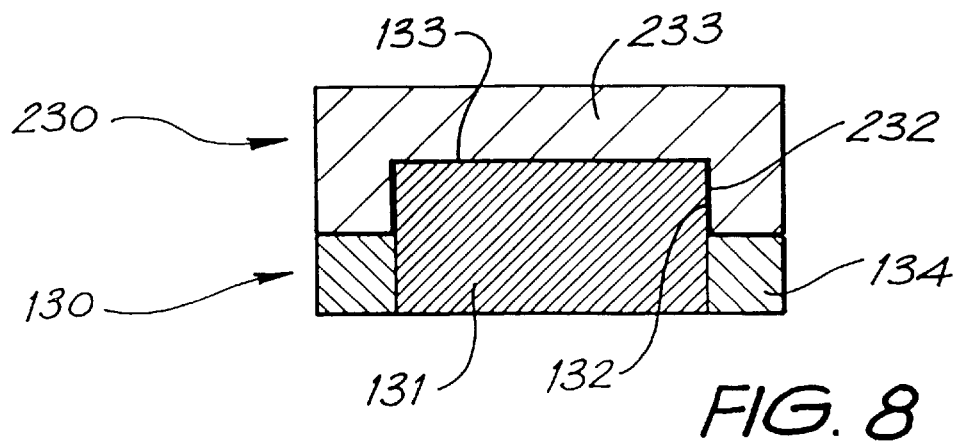
FIG. 8 is a schematic cross sectional view of a primary frame lug secured to an auxiliary frame lug.
Figure 9:
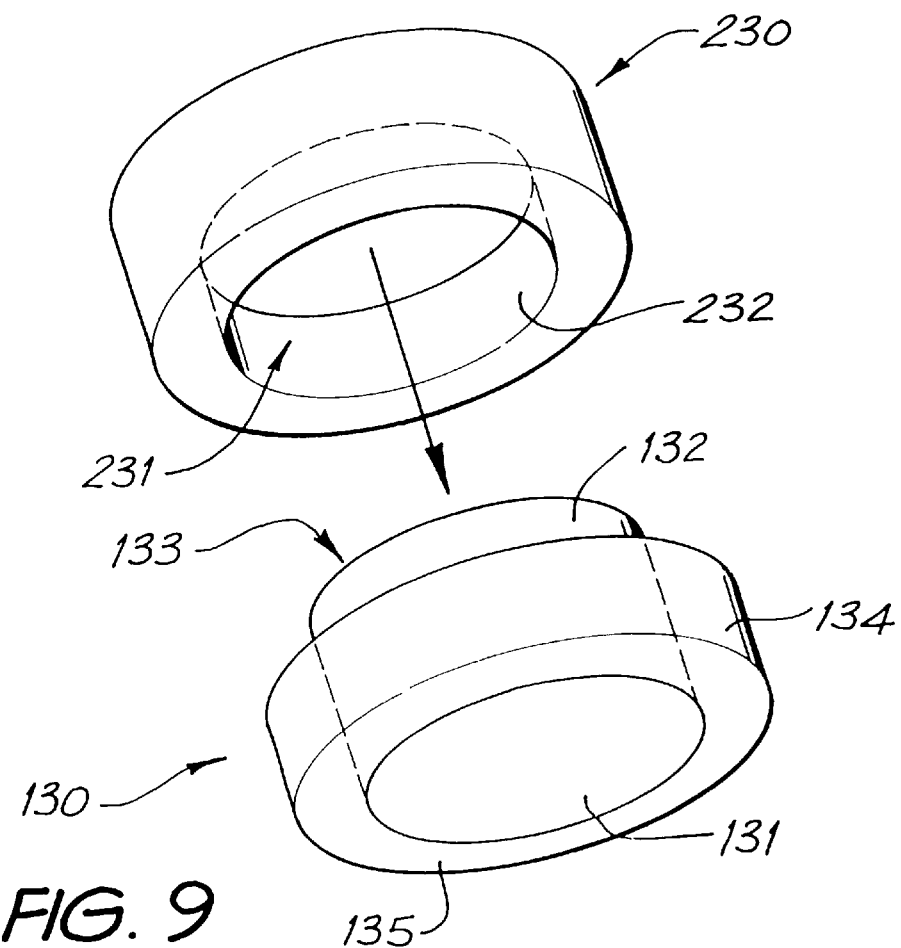
FIG. 9 is a schematic isometric view from below of a primary frame lug and an auxiliary frame lug.

As best depicted in FIGS. 8 and 9, each primary frame lug 130 is provided with a magnetic member 131 which is received in an open cavity 231 provided in the corresponding auxiliary frame lug 230. The open cavity 231 has a peripheral wall 232, which is here cylindrical, which engages a corresponding peripheral wall 132 of the magnetic member 131, which is here also cylindrical. The magnetic member 131 is hence retained in the open cavity 231, and the auxiliary frame lug 230 can not readily slide off the top of the primary frame lug 130 to detach the auxiliary frame 200 from the primary frame 100 as is the case with currently available magnetically attached auxiliary frames. The auxiliary frame lug 230 is at least partially formed of a ferrous material to facilitate the magnetic securing of the auxiliary frame lug 230 to the primary frame lug 130. The auxiliary frame lug 230 is hence secured to the primary frame lug by both a magnetic force and the physical connection of the magnetic member peripheral wall 132 to the auxiliary frame lug 230 within the open cavity 231. The auxiliary spectacle frame 200 of the preferred embodiment is thus restrained against horizontal and vertical movement relative to the primary spectacle frame 100. The current applicant refers to the secure spectacle assembly thus provided by the engaging magnetic members 131 and open cavities 231 as a monomagnetic clip-on assembly (MMCA).

In the preferred embodiment the entire auxiliary frame lug 230, and in fact the entirety of the auxiliary spectacle frame 200, is formed of steel. The primary spectacle frame 100 is also formed largely of steel, however persons skilled in the art will appreciate that the current invention is applicable to primary and secondary spectacle frames of any suitable material, typically metallic or plastic, so long as the auxiliary frame lugs 230 are at least partially formed of ferrous material for cooperating with the magnetic members 131.

Each primary frame lug 130 comprises a ring 134 which is secured to the primary frame arm 112, here by soldering, and the magnetic member 131 secured in the ring, here by a suitable adhesive, such that the peripheral wall 132 of the magnetic member 131 protrudes above the ring 134, enabling it to be received in the open cavity 232 of the auxiliary frame lug 230. The magnetic member 131 of the depicted embodiment is a high strength cylindrical magnet with a diameter of approximately 4 mm and a height of approximately 2 mm. The ring 134 should have a minimal thickness to allow the maximum exposure of the magnetic member peripheral wall 132 above the top of the ring 134, yet still thick enough to ensure the magnetic member can be effectively secured thereto. Here the ring 134 is approximately 1 mm thick, leaving 1 mm of the magnetic member peripheral wall 134 exposed for engaging the open cavity peripheral wall 232 of the auxiliary frame lug 230.

Each of the auxiliary frame lugs 230 here comprises a hollow cylinder 230 secured to the auxiliary frame arm 212, by soldering or other suitable means. For added strength the auxiliary frame lug 230 could be cast integrally with the auxiliary frame arm 212 rather than mounted separately on the arm. Casting a solid auxiliary frame arm 212 rather than a thin wire also helps prevent bending of the arms which would require readjustment to enable the auxiliary frame lugs 230 to engage the primary frame lugs 130. The open cavity 231 of the auxiliary frame lug 230 is defined by the hollow of the hollow cylinder. Here the open cavity 231 of each auxiliary frame lug 230 is open at the lower end only, with the upper end of the open cavity being closed by an upper wall 233 of ferrous material for engaging an upper surface 133 of the magnetic member 131 of the primary frame lug 130, thereby increasing the size of the surface of the auxiliary frame lug 230 on which the magnetic member 131 acts. The lower surface of the hollows cylinder 230 is seated on the upper surface of the ring 134 of the primary frame lug 130.

Alternatively, both the upper and lower ends of the open cavity 231 of the auxiliary frame lug could be open such that the auxiliary frame lug hollow cylinder 230 is in the general form of a ring which engages the exposed peripheral wall 132 of the magnetic member 131, and leaving the upper wall 133 of the magnetic member 131 exposed. This alternative can reduce the total height of the auxiliary frame lug 230 by removing the upper wall.

Rather than providing the primary frame lugs 130 with the magnetic members 131 and the auxiliary frame lugs 230 with the open cavities 231, the primary frame lugs could be provided with open cavities for receiving magnetic members provided on the auxiliary frame lugs in much the same manner. In such an embodiment, the primary frame lugs would need to be formed at least partially of ferrous material for cooperating with the magnetic members.

To enhance the aesthetics of the spectacle frame assembly and to reduce the possibility of damage, the primary frame lugs 130 are typically disposed rearwardly of the primary frame arms 112. The auxiliary frame arms 212 extend over the primary frame arms 112 so as to position the auxiliary frame lugs 230 for engagement with the primary frame lugs 130.

In the preferred embodiment, to further enhance aesthetics, particularly of the primary spectacle frame 100 when used without the auxiliary frame 200, the lower surface 135 of each primary frame lug is substantially flush with the lower surface 112a of the primary frame arm 112, and the upper surface 133 of each primary frame lug 130 is substantially flush with the upper surface 112b of the primary frame arm 112. This configuration provides the maximum thickness of primary frame lug 130 which is hid 130 behind the primary frame arms 112 so that the primary frame lugs 130 will generally not be seen when the primary spectacle frame 100 is worn by itself (as is evident from FIG. 1).

The current invention is equally applicable to rimmed primary and auxiliary spectacle frames 100, 200 as depicted in FIGS. 1 through 7, or to rimless designs as depicted in FIG. 10 through 14. For the rimmed primary spectacle frame design of FIGS. 1 to 3, the primary frame front 110 includes a pair of primary frame rims 113 for receiving a pair of primary lenses, which will typically be prescription lenses, and a primary frame bridge 114 secured to and separating the primary frame rims 113 in the usual manner, with the primary frame arms 112 of the frame front 110 being secured to laterally outer portions 113a of each of the primary frame rims 113, again in the usual manner.

Figure 4:
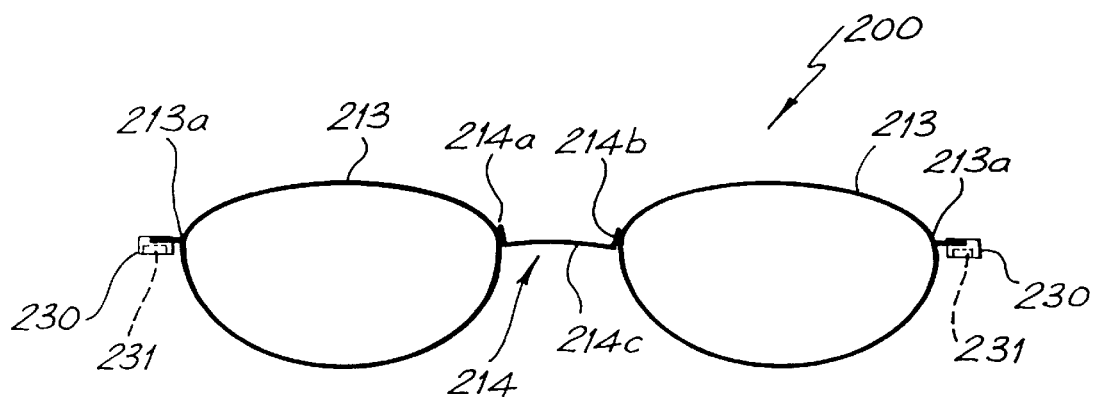
FIG. 4 is a front elevation view of an auxiliary spectacle frame.
Figure 5:
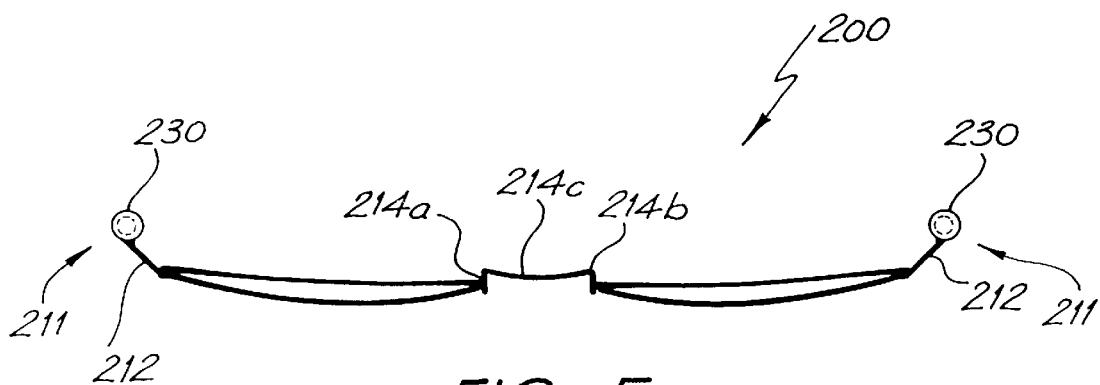
FIG. 5 is a plan view of the auxiliary spectacle frame of FIG. 4.

The rimmed auxiliary spectacle frame 200 of FIGS. 4 and 5 includes a pair of auxiliary frame rims 213 for receiving a pair of auxiliary lenses, which will typically be tinted sunglass lenses and will usually be provided already fitted to the rims 213, and an auxiliary frame bridge 214 secured to and separating the auxiliary frame rims 212. The auxiliary frame arms 212 are secured to laterally outer portions 213a of each of the auxiliary frame rims 213.

To assist with providing a rigid attachment of the auxiliary spectacle frame 200 to the primary spectacle frame 100, the auxiliary frame bridge 214 is designed to extend over and engage the primary frame bridge 114. The auxiliary frame bridge 214 is comprised of end portions 214a which are secured to the auxiliary frame rims 213 and each extend rearwardly over the primary frame bridge to an intermediate portion 214b extending downwardly to a central portion 214c extending between the intermediate portions 214b. The end portions 214a rest on the top surface of the primary frame bridge 114, preventing the auxiliary spectacle frame 200 from moving downwards relative to the primary spectacle frame 100. The central portion 214c is hooked behind the primary frame bridge 114 preventing the top of the auxiliary spectacle frame 200 from tilting forward.

Figure 10:
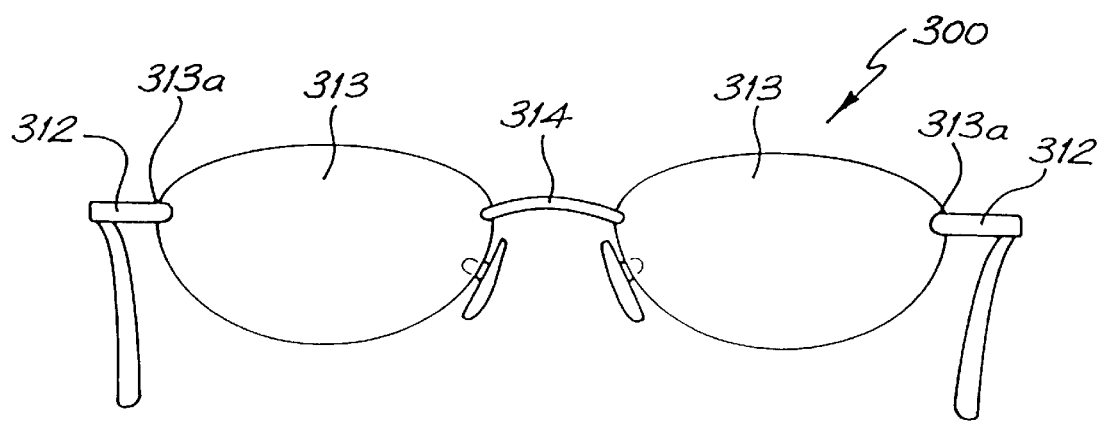
FIG. 10 is a front elevation view of a rimless primary spectacle frame.
Figure 11:
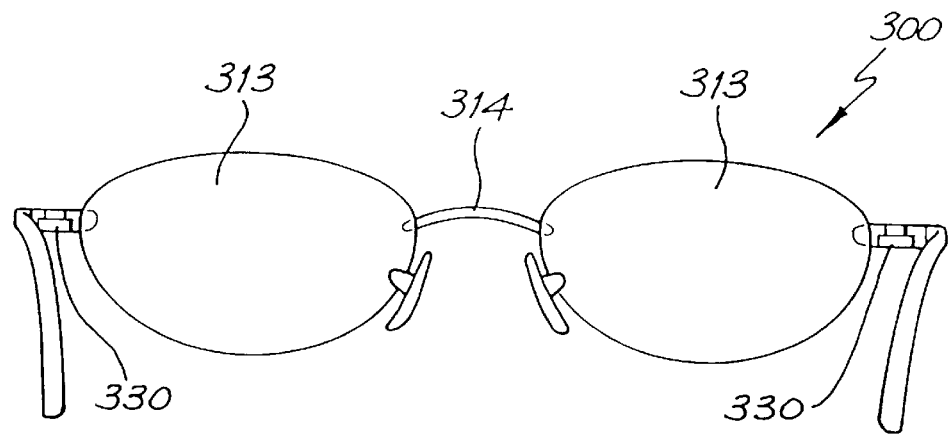
FIG. 11 is a rear elevation view of the rimless primary spectacle frame of FIG. 10.
Figure 12:
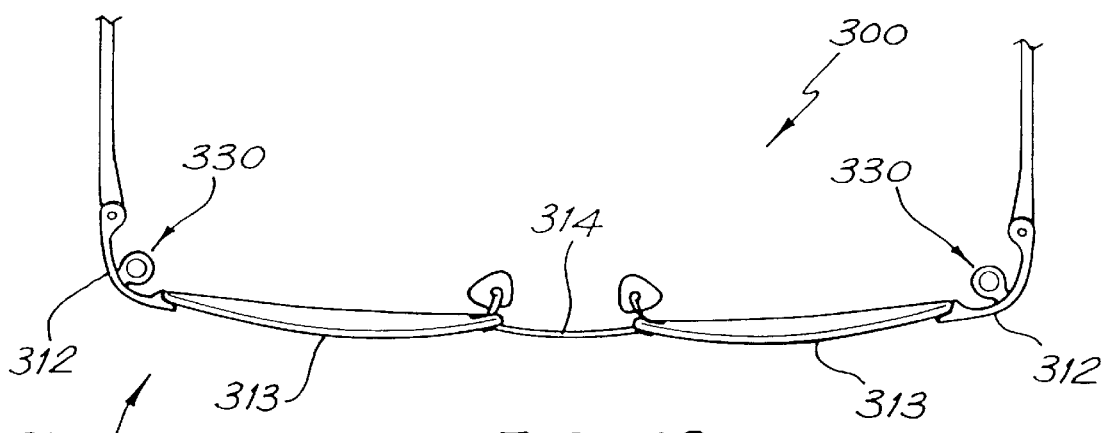
FIG. 12 is a plan view of the rimless primary spectacle frame of FIG. 10.

As discussed above, the current invention can be applied to rimless primary and/or auxiliary spectacle frames. FIGS. 10 through 12 depict a primary spectacle frame 300 with its primary spectacle frame front 310 including a pair of primary lenses 313, an auxiliary frame bridge 314 secured to and separating the primary lenses 313 and primary frame arms 312 secured to laterally outer portions 313a of each of the primary lenses 313. The primary frame lugs 330 can be configured in the same manner as described above.

Figure 13:
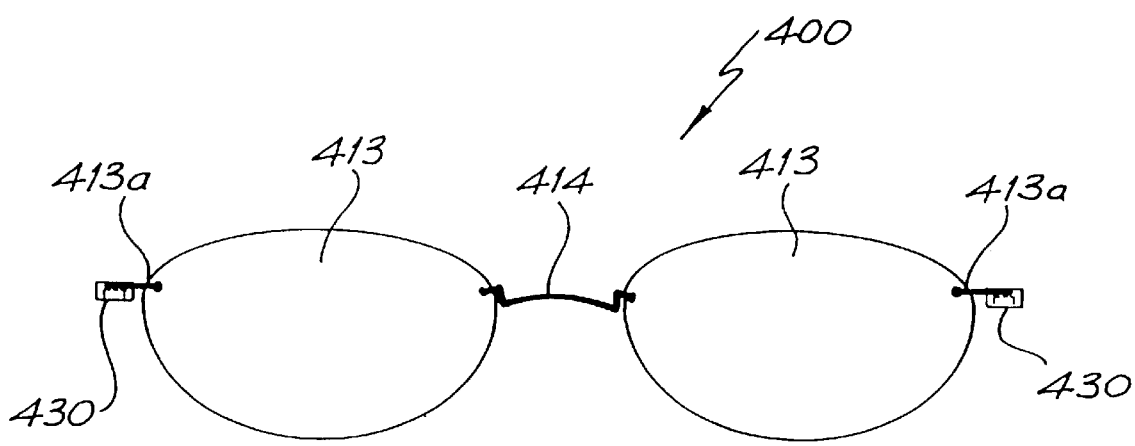
FIG. 13 is a front elevation view of a rimless auxiliary spectacle frame.
Figure 14:
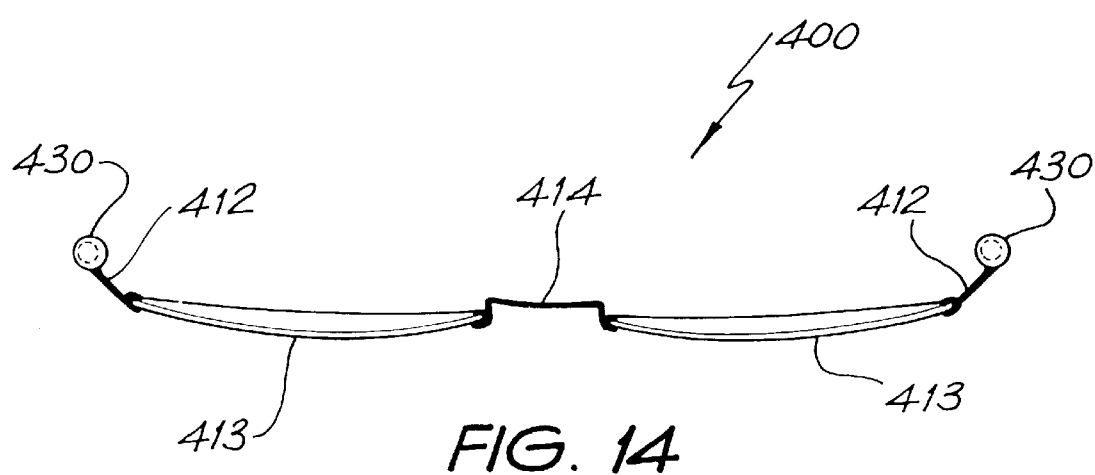
FIG. 14 is a plan view of the rimless auxiliary spectacle frame of FIG. 13.

FIGS. 13 and 14 similarly depict a rimless auxiliary spectacle frame 400 which includes a pair of auxiliary lenses 413, an auxiliary frame bridge 414 secured to and separating the auxiliary lenses 413, auxiliary frame arms 412 secured to laterally outer portions 413a of each of the auxiliary lenses 412 and auxiliary frame lugs 430 which are configured and operate in the same manner as discussed above. If so desired, a rimless auxiliary spectacle frame 400 can be used with a rimmed primary spectacle frame 100 and vice versa.

What is claimed is:

1. A spectacle frame assembly comprising:
a primary spectacle frame having a primary frame front, a pair of temples pivotally coupled to respective laterally outer ends of said primary frame front and a pair of primary frame lugs secured to said primary frame front adjacent respective said primary frame front laterally outer ends, and
an auxiliary spectacle frame having a pair of auxiliary frame lugs disposed at respective laterally outer ends thereof, each said auxiliary frame lug being engageable with a corresponding said primary frame lug with said auxiliary frame lug disposed on top of said corresponding primary frame lug for securing said auxiliary spectacle frame to said primary spectacle frame,
wherein, for each pair of corresponding primary and auxiliary frame lugs, one of said primary and auxiliary frame lugs is provided with a magnetic member receivable in an open cavity provided in the other one of said primary and auxiliary frame lugs, said open cavity having a peripheral wall for engaging a peripheral wall of said magnetic member, said other one of said primary and auxiliary frame lugs being formed at least partially of a ferrous material.

2. The spectacle frame assembly of claim 1 wherein said primary spectacle frame front is provided with a pair of primary frame arms toward respective said laterally outer ends thereof, said temples being pivotally coupled to respective said primary frame arms and said primary frame lugs being secured to respective said primary frame arms.

3. The spectacle frame assembly of claim 2 wherein said auxiliary spectacle frame is provided with a pair of auxiliary frame arms toward respective said opposing laterally outer ends thereof, said auxiliary frame lugs being secured to respective said auxiliary frame arms.

4. The spectacle frame assembly of claim 3 wherein said primary frame lugs are disposed rearwardly of said primary frame arms, said auxiliary frame arms being adapted to extend over said primary frame arms to enable engagement of said primary and auxiliary frame lugs.

5. The spectacle frame assembly of claim 2, wherein a lower surface of each said primary frame lug is substantially flush with a lower surface of the respective said primary frame arm.

6. The spectacle frame assembly of claim 2, wherein an upper surface of each said primary frame lug is substantially flush with an upper surface of the respective said primary frame arm.

7. The spectacle frame assembly of claim 1 wherein each of said primary frame lugs is provided with a said magnetic member and each of said auxiliary frame lugs is provided with a said open cavity.

8. The spectacle frame assembly of claim 7, wherein each said primary frame lug comprises a ring secured to the respective said primary frame arm and a said magnetic member secured in said ring such that said magnetic member peripheral wall protrudes above said ring.

9. The spectacle frame assembly of claim 7, wherein each of said auxiliary frame lugs comprises a hollow cylinder secured to the respective said auxiliary frame arm, said open cavity being defined by the hollow of said hollow cylinder.

10. The spectacle frame assembly of claim 7 wherein said open cavity of each said auxiliary frame lug is open at a lower end only for receiving said magnetic member, an upper end of said cavity being closed by a wall of ferrous material for engaging an upper surface of said magnetic member.

11. The spectacle frame assembly of claim 10 wherein said open cavity of each said auxiliary frame lug is open at both upper and lower ends thereof.

12. The spectacle frame assembly of claim 7 wherein each said auxiliary frame lug is made substantially entirely of ferrous material.

13. The spectacle frame assembly of claim 1 wherein each of said auxiliary frame lugs is provided with a said magnetic member and each of said primary frame lugs is provided with a said open cavity.

14. The spectacle frame assembly of claim 1 wherein said primary frame front includes a pair of primary frame rims for receiving a pair of primary lenses and a primary frame bridge secured to and separating said primary frame rims, said primary frame arms being secured to laterally outer portions of each of said primary frame rims.

15. The spectacle frame assembly of claim 1 wherein said primary frame front includes a pair of primary lenses and an auxiliary frame bridge secured to and separating said primary lenses, said primary frame arms being secured to laterally outer portions of each of said primary lenses.

16. The spectacle frame assembly of claim 1 wherein said auxiliary spectacle frame includes a pair of auxiliary frame rims for receiving a pair of auxiliary lenses and an auxiliary frame bridge secured to and separating said auxiliary frame rims, said auxiliary frame arms being secured to laterally outer portions of each of said auxiliary frame rims.

17. The spectacle frame assembly of claim 16 wherein said auxiliary frame bridge extends over and engages said primary frame bridge.

18. The spectacle frame assembly of claim 1 wherein said auxiliary spectacle frame includes a pair of auxiliary lenses and an auxiliary frame bridge secured to and separating said auxiliary lenses, said auxiliary frame arms being secured to laterally outer portions of each of said auxiliary lenses.

19. A spectacle frame assembly comprising:
a primary spectacle frame having a pair of primary frame rims for receiving a pair of primary lenses, a primary frame bridge separating said primary frame rims, a primary frame arm secured to laterally outer portions of each of said primary frame rims, a temple pivotally coupled to each said primary frame arm and a primary frame lug secured to each of said primary frame arms, and
an auxiliary spectacle frame having a pair of auxiliary frame rims for receiving a pair of auxiliary lenses, an auxiliary frame bridge separating said auxiliary frame rims, an auxiliary frame arm secured to laterally outer portions of each of said auxiliary frame rims and an auxiliary frame lug secured to each of said auxiliary frame arms, said auxiliary frame lugs each being engageable with a corresponding said primary frame lug with said auxiliary frame lug disposed on top of said primary frame lug so as to secure said auxiliary spectacle frame to said primary spectacle frame,
wherein, for each pair of corresponding primary and auxiliary frame lugs, one of said primary and auxiliary frame lugs is provided with a magnetic member receivable in an open cavity provided in the other one of said primary and auxiliary frame lugs, said open cavity having a peripheral wall for engaging a peripheral wall of said magnetic member, said other one of said primary and auxiliary frame lugs being formed at least partially of a ferrous material.

* * * * *